(12) United States Patent
Huang

(10) Patent No.: US 9,386,254 B2
(45) Date of Patent: Jul. 5, 2016

(54) BROADCAST METHOD AND BROADCAST APPARATUS

(71) Applicant: MStar Semiconductor, Inc., Hsinchu Hsien (TW)

(72) Inventor: Hung-Chi Huang, Taichung (TW)

(73) Assignee: MStar Semiconductor, Inc., Hsinchu Hsien ( * ) Notice: Subject to any disclaimer, the term of this patent is extended or adjusted under 35 U.S.C. 154(b) by 216 days.

(21) Appl. No.: 14/023,578

(22) Filed: Sep. 11, 2013

(65) Prior Publication Data
US 2014/0078405 A1 Mar. 20, 2014

(30) Foreign Application Priority Data
Sep. 14, 2012 (TW) .............................. 101133672 A

(51) Int. Cl.
| *H04L 9/32* | (2006.01) |
| *G05B 11/01* | (2006.01) |
| *H04N 5/44* | (2011.01) |
| *H04N 21/422* | (2011.01) |
| *H04N 21/482* | (2011.01) |
| *H04N 21/485* | (2011.01) |

(52) U.S. Cl.
CPC ....... *H04N 5/4403* (2013.01); *H04N 21/42227* (2013.01); *H04N 21/482* (2013.01); *H04N 21/485* (2013.01); *H04N 2005/4439* (2013.01)

(58) Field of Classification Search
CPC .................. G05B 2219/2615; H04N 21/4756; H04N 21/4751; H04N 21/4753; H04N 21/4755; H04N 21/42204; H04N 21/42227; H04N 21/482; H04N 5/4403; H04N 21/485; H04N 21/4532; H04L 12/2814
USPC ............................................. 340/5.22, 12.22
See application file for complete search history.

(56) References Cited

U.S. PATENT DOCUMENTS

| 2003/0108227 | A1* | 6/2003 | Philomin et al. ............. 382/124 |
| 2003/0126600 | A1* | 7/2003 | Heuvelman ..................... 725/35 |
| 2003/0229900 | A1* | 12/2003 | Reisman ......................... 725/87 |
| 2006/0107281 | A1* | 5/2006 | Dunton .............. G07C 9/00158 725/11 |
| 2007/0288961 | A1* | 12/2007 | Guldi ................... H04N 7/0885 725/46 |
| 2007/0299670 | A1* | 12/2007 | Chang .......................... 704/275 |
| 2009/0059090 | A1* | 3/2009 | Fan .................... G07C 9/00031 348/734 |

OTHER PUBLICATIONS

Taiwan Intellectual Property Office, "Office Action," Jul. 8, 2015.

* cited by examiner

*Primary Examiner* — Steven Lim
*Assistant Examiner* — Mancil Littlejohn, Jr.
(74) *Attorney, Agent, or Firm* — WPAT, PC; Justin King; Jonathan Chiang

(57) ABSTRACT

A broadcast apparatus is provided. The broadcast apparatus is signally connected to an input apparatus, which generates a plurality of corresponding control signals according to a plurality of operations. A broadcast method is also provided. The broadcast method includes: receiving one of the control signals; determining identification information and a set of broadcast parameters when the one of the control signals matches a tag; and broadcasting according to the set of broadcast parameters.

17 Claims, 3 Drawing Sheets

| Tag | Verification information | Pre-stored broadcast parameters ||||
|---|---|---|---|---|---|
| | | Channel | Volume | Subtitles | Subtitle font siz |
| Watch a movie | User A | HBO | 10 | Yes | 8 |
| | User B | AXN | 15 | No | N/A |

| Tag | Verification information | Pre-stored broadcast parameter |
|---|---|---|
| | | Volume |
| Louder | User A | +10 |
| | User B | +5 |

| Tag | Verification information | Pre-stored broadcast parameter |
|---|---|---|
| Turn off | User A | Perform turn-off procedure |
| | User B | |

BROADCAST METHOD AND BROADCAST APPARATUS

This application claims the benefit of Taiwan application Serial No. 101133672, filed Sep. 14, 2012, the subject matter of which is incorporated herein by reference.

BACKGROUND OF THE INVENTION

1. Field of the Invention

The invention relates in general to a broadcast apparatus and a broadcast method, and more particularly, to a broadcast apparatus and a broadcast method having personalized broadcast parameters.

2. Description of the Related Art

FIG. 1 shows a schematic diagram of a user controlling a broadcast apparatus through a remote controller in the prior art. In FIG. 1, it is assumed that, in a main menu, a broadcast apparatus 11 provides an Internet television broadcast function, a personal video recorder (PVR) playback function, a DVD playback function and a video game function.

A method for controlling the broadcast apparatus 11 is generally as follows. After viewing the menu on a screen, a user 1 selects a desired function with a remote controller such as an input device 12, and performs corresponding controls. That is, to meet personal requirements, a user needs to figure out a current state of the broadcast apparatus 11, and how to select a function from the menu.

In FIG. 1, the function menu is presented as a function menu in hierarchical tree structure. For example, the user 1 may first learn that the main menu provides four options of Internet television, PVR playback, DVD playback and video games after turning on the broadcast apparatus 11.

Among the above four options, the Internet television function provides various types of channels, allowing the user to select a movie channel, an entertainment channel or a news channel. Each type of channels may further involve several channels. For example, when the user enters a movie channel menu, the user may further select a desired movie channel from a movie channel A, a movie channel B and a movie channel C. Similarly, when the user enters a news channel menu, the user may further select a desired news channel from a first news channel #1, a second news channel #2 and a third news channel #3.

Taking the video games function for example, with many available game options (e.g., games A, B, C, . . . and Z) provided in the video game mode, the user needs to first select a desired game (e.g., a game H) from the various options. After selecting the desired game, the user may need to further select settings such as one-player mode or multi-player mode as well as a game difficulty level. That is, in addition to selecting the type of game to be played, the user is required to make further selections from the game menu.

Similarly, the PVR playback function, the DVD playback function or other functions supported by the broadcast apparatus 11 also need to be manually selected by the user. Further, other preferences such as volume and subtitle settings may require frequent and repetitive setting due to different users and personal habits.

That is to say, while providing various audio/video functions, the broadcast apparatus 11 may also bring forth a complicated operation interface, which may be intimidating to the commons with merely ordinary skills in electronic products. In other words, the conventional broadcast apparatus 11 needs to yet provide more user-friendly manipulations.

To improve the sophisticated function menu and control operations of the broadcast apparatus 11, in the prior art, a remote control device having memory function is developed for cooperating with a broadcast apparatus.

In short, several user-preferred functions are pre-recorded in the remote control device having a memory function. For example, after setting a hotkey A, while a user watches a news channel, the hotkey A may be pressed to directly prompt the broadcast apparatus to stop broadcasting the news channel and to switch to perform a pre-selected video game function.

Although the remote control device having a memory function in the prior art eliminates the issue of a user manually selecting a desired function from a complicated menu, such approach is rather standardized, allowing only limited flexibilities.

For example, a user needs to perform a process below when setting the hotkey A. To correspond to the hotkey A to a predetermined operation, the user needs to switch from the news channel to the video game mode, and to choose a personalized mode of activating a video game A with a difficulty level of 10.

Meanwhile, a process of the remote control device corresponding to the hotkey A is selecting an exit key [→], selecting the exit key [→], selecting a down key [↓] for three consecutive times, selecting the down key [↓] for nine consecutive times, and pressing a select key [OK/enter].

However, environmental settings of each user operation may not always be the same.

For example, instead of starting video games after watching the news channel, the user may start video games after watching a DVD. Further, the video game desired by the user may also change, e.g., the video game A previously set may change to the video game Z, or the difficulty level of the video game A may be reduced and the player mode may be adjusted to a double-player mode when playing video games with family.

For any of the above situations, the control procedure corresponding to the hotkey A cannot be directly applied to the broadcast apparatus. In other words, in the event that the initial function menu or target function option differs from an initially configured process of the hotkey A, the hotkey A may fail to fully practice an effect of simplified controls.

Therefore, only when the remote control device is capable of recording all possible function switch settings, the control procedure of the broadcast apparatus can then be simplified through the remote control device. However, for diversified functions offered by the broadcast apparatus and an even greater number of combinations from these functions, the control procedure of the remote control device provides a rather limited control procedure—the control procedure of the broadcast apparatus is simplified through converting merely several specific initial functions to target functions. Further, although the remote control device provides multiple keys for accommodating various operation combinations, the user is required to memorize the combinations of the hotkeys. Therefore, there is a need for an improved solution for a menu switching method of the broadcast apparatus.

SUMMARY OF THE INVENTION

According to an aspect of the present invention, a broadcast method for a broadcast apparatus signally connected to an input apparatus is provided. The input apparatus generates a plurality of corresponding control signals according to a plurality of operations. The broadcast method comprises: receiving one of the control signals, determining verification information and a set of broadcast parameters when the one of the control signals matches a tag, and broadcasting according to the set of broadcast parameters.

According to another aspect of the present invention, a broadcast apparatus is provided. The broadcast apparatus is signally connected to an input apparatus, which generates a plurality of corresponding control signals according to a plurality of operations. The broadcast apparatus comprises: a reception unit, for receiving the control signals; a control unit, coupled to the reception unit, for determining a tag and verification information according to the control signals; a storage unit, coupled to the control unit, storing a parameter database; and a broadcast unit, coupled to the control unit and the storage unit, for retrieving a set of broadcast parameters from the parameter database according to the tag and the verification information.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
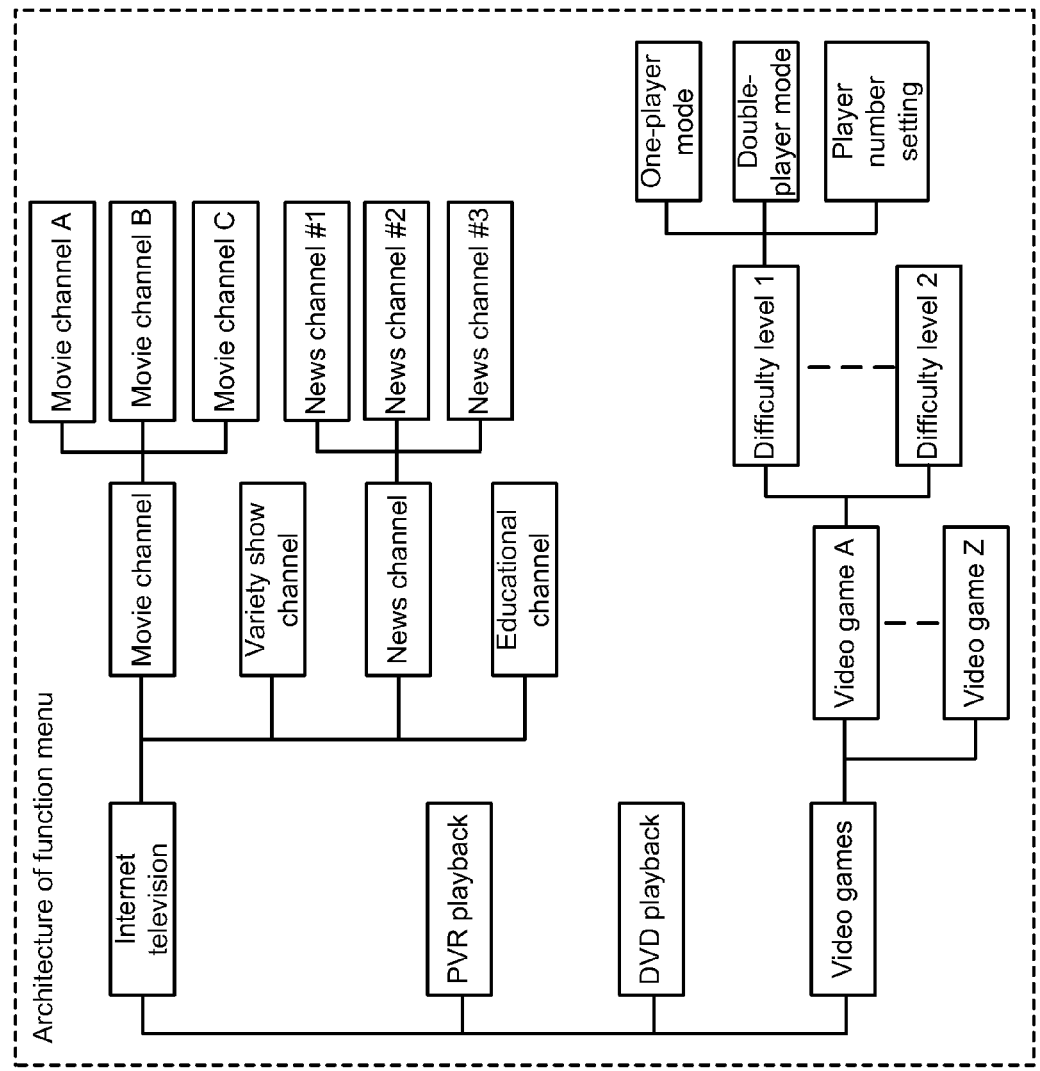
FIG. 1 is a schematic diagram of a user controlling a broadcast apparatus through a remote controller in the prior art.
Figure 1:
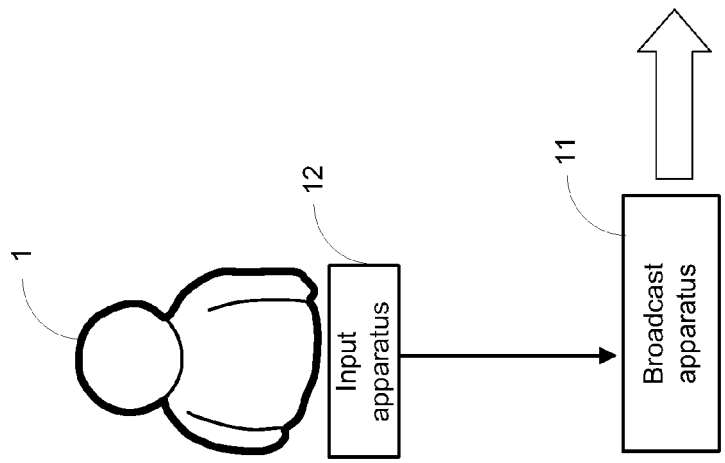
Figures 2, 3A, 3B, 3C:
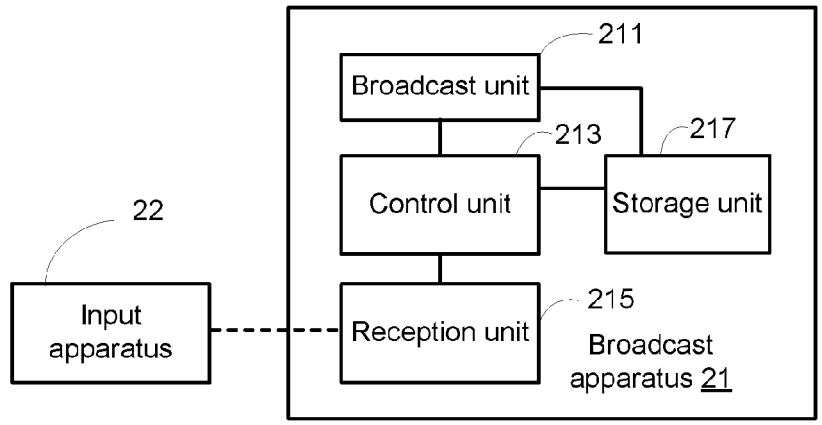
FIG. 2 is a block diagram of a broadcast apparatus with personalized operation functions according to an embodiment of the present invention.
FIG. 3A is a schematic diagram of a correspondence method for broadcast parameters, a tag and verification information provided by the broadcast apparatus when a control signal matching the same tag is generated by different users according to a preferred embodiment of the present invention.
FIG. 3B is a schematic diagram of another correspondence method for broadcast parameters, a tag and verification information provided by the broadcast apparatus when a control signal matching the same tag is generated by different users according to a preferred embodiment of the present invention.
FIG. 3C is a schematic diagram of pre-stored broadcast parameters in the broadcast apparatus staying unchanged for different user identities when a modification property of a tag is a limited modification property according to a preferred embodiment of the present invention.

FIG. 2 shows a block diagram of a broadcast apparatus with personalized operation functions according to an embodiment of the present invention. Referring to FIG. 2, a broadcast apparatus 21 is signally connected to an input apparatus 22. The input apparatus 22 generates a control signal in response to an operation, and transmits the control signal to the broadcast apparatus 21. In practice, the input apparatus may be embedded in the broadcast apparatus.

The broadcast apparatus 21 comprises a reception unit 215, a control unit 213, a broadcast unit 211 and a storage unit 217. The reception unit 215 is signally connected to the input apparatus 22, and receives control signals generated and transmitted by the input apparatus 22 through a wired or wireless network, a data line or an electronic connection. The control unit 213 is coupled to the reception unit 215, the broadcast unit 211 is coupled to the reception unit 215 and the control unit 213, and the storage unit 217 is coupled to the control unit 213 and the broadcast unit 211.

According to an embodiment of the present invention, operations of the broadcast apparatus 21 may be divided into two phases—a storage phase and a broadcast phase.

Operations of the storage phase of the broadcast apparatus 21 are first described below.

A user generates a control signal through the input apparatus 22 such as a microphone, a keyboard and a touch panel, so that the broadcast apparatus 21 determines a tag and verification information according to the control signal.

The type of the tag is dependent on functions provided by the broadcast apparatus 21, e.g., a multimedia broadcast instruction, a website browsing instruction and a game execution instruction.

The verification information refers to an identity of a user initiating the control signal. A control signal having the same tag may be initiated by different users, meaning that the verification information may be different although a tag obtained according to the control signal is the same.

The user then manually performs an operation to control the input apparatus 22, e.g., channel selection and volume adjustment. The input apparatus 22 transmits the control signal corresponding to the operation to the broadcast apparatus 21, so that the broadcast apparatus 21 switches from a first broadcast state to a second broadcast state according to the control signal, e.g., switching from a main menu displayed right after turning on the broadcast apparatus 21 to a news channel.

While starting to perform operations corresponding to the second broadcast state, the broadcast apparatus 21 also accordingly generates a set of pre-stored broadcast parameters, e.g., a channel number of a television channel, a volume setting for playing a news channel, a vocal channel utilized or a subtitle language. Alternatively, when the second broadcast state refers to playing video games or using Internet functions, the pre-stored broadcast parameters are correspondingly a mode setting, a level setting or a game content setting of a video game, or a website address or a user account and password.

Next, the broadcast apparatus 21 establishes and stores a corresponding relationship of the tag, the verification information and the pre-stored broadcast parameters. For example, when a user A initiates a control signal of "watch television", the control signal corresponds to a news channel 13, a volume setting of 20, a broadcast language in English and a subtitle language in English.

Operations of the broadcast apparatus 21 in the storage phase are summarized as follows from the foregoing descriptions. The reception unit 215 receives a control signal generated by the input apparatus 22; the control unit 213 determines the tag and verification information according to the control signal; the broadcast unit 211 switches from a first broadcast state to a second broadcast state according to control signals corresponding to a plurality of operations to accordingly generate a set of corresponding pre-stored broadcast parameters; and the storage unit 217 stores a corresponding relationship of the tag, the verification information and the pre-stored broadcast parameters.

Operations of the broadcast apparatus 21 in the broadcast phase are to be discussed below.

A user generates a control signal through the input apparatus 22 such as a microphone, a keyboard and a touch panel, so that the apparatus 21 determines a tag and verification information according to the control signal. As previously stated, the tag refers to operations such as "play video games" and "watch the video" to be performed by the broadcast apparatus, and the verification information refers to an identity of a user initiating the control signal.

After determining the tag and the verification information from the control signal, the broadcast unit 211 retrieves broadcast parameters from the parameter database according to the tag and the verification information, and executes the tag according to the broadcast parameters.

Operations of the broadcast apparatus 21 in the broadcast phase are summarized as follows from the foregoing descriptions. The reception unit 215 receives the control signal; the control unit 213 determines the tag and the verification information according to the control signal; the storage unit 217 provides the parameter database; and the broadcast unit 211 retrieves at least one set of broadcast parameters from the parameter database according to the tag and the verification information, and executes the tag according to the at least one set of broadcast parameters.

It should be noted that, in both the storage phase and the broadcast phase, the control unit 213 of the present invention automatically determines the tag and the verification information according to the control signal. In an embodiment, the control unit 213 performs a signal process on the control signal to accordingly obtain a tag, and performs a biological characteristic retrieval on the control signal to generate biological characteristic data for verification and to accordingly obtain the verification information. Techniques associated with the biological characteristic retrieval and determination as well as applications of the database may be implemented by various known biological technology application techniques, and are not to be construed as limitations to the present invention.

In an embodiment, the user A initiates a controls signal matching a tag of "watch television". The control unit 213 determines that the control signal initiated by user matches the tag of "watch television" through speech analysis, and then determines that the control signal is generated by the user A according to voiceprint characteristics (biological characteristics) of the speech.

In an alternative embodiment, a user B initiates a controls signal matching a tag of "watch television" by touch writing. The control unit 213 determines that the control signal initiated by user matches the tag of "watch television" through recognition software, and then determines that the control signal is generated by the user B according to fingerprint characteristics (biological characteristics).

It should be noted that, the corresponding relationship between the verification information and the tag may also be a multi-correspondence relationship. That is, the user A may verbally initiate a control signal matching a tag of "watch television", or may initiate a control signal matching the same tag through touch control. Therefore, given that the broadcast apparatus is capable of identifying the biological characteristic data corresponding to a user identity, the present invention is not limited to providing only a single corresponding relationship between the verification information and the tag.

FIG. 3A shows a schematic diagram of a correspondence method for broadcast parameters, a tag and verification information provided by the broadcast apparatus when a control signal matching the same tag is generated by different users according to a preferred embodiment of the present invention.

During the process of storing an instruction, assume that the user A initiates a control signal matching a tag of "watch a movie", and switches the channel to "HBO", adjusts the volume to 10, turns on the subtitles, and sets the subtitles to a font size of 8. Meanwhile, assume that the user B initiates a control signal matching a tag of "watch a movie", switches the channel to "AXN", adjusts the volume to 15, and turns off the subtitles.

Thus, when storing the corresponding relationship of the tag, the verification information and the pre-stored broadcast parameters, the corresponding relationship may be recorded according to the method in FIG. 3A. It should be noted that, the types and columns of the parameter database for storing the pre-stored broadcast parameters are not limited to the examples in FIG. 3A.

Once the broadcast apparatus has recorded the data contents in FIG. 3A with the storage unit, the broadcast apparatus is capable of providing a personalized operation environment when a control signal matching a tag of "watch a movie" is initiated by either of the user A and the user B.

More specifically, when the user A generates a control signal by speaking "watch a movie", the broadcast apparatus automatically switches the channel to "HBO", adjusts the volume to 10, displays the subtitles, and sets the font size of the subtitles to 8. When the user B generates a control signal matching the tag "watch a movie", the broadcast apparatus automatically switches the channel to "AXN", adjust the volume to 15, and turns off the subtitles.

FIG. 3B shows a schematic diagram of another correspondence method for broadcast parameters, a tag and verification information provided by the broadcast apparatus when a control signal matching the same tag is generated by different users according to a preferred embodiment of the present invention.

As shown in FIG. 3B, broadcast parameters for a tag of "louder" for the user A and the user B are recorded. When the user A initiates a speech matching a tag of "louder" for the first time, a volume increase key of the input apparatus is pressed for ten times, so that the corresponding broadcast parameter in the column of the tag "louder" recorded in the parameter database is +10. Similarly, when the user B initiates a speech matching a tag of "louder" for the first time, a volume increase key of the input apparatus is pressed for five times, so that the corresponding broadcast parameter in the column of the tag "louder" recorded in the parameter database is +5. It should be noted that the types and the columns for storing the pre-stored broadcast parameters in the parameter database are not limited to the above examples.

Once the broadcast apparatus has recorded the data contents in FIG. 3B by use of the storage unit, the broadcast apparatus is capable of providing a personalized operation environment when a control signal matching a tag of "louder" is initiated by either of the user A and the user B. That is, when the user A speaks "louder", the broadcast apparatus automatically adjusts the original volume to a volume increased by +10 regardless of whether the user A is originally watching a movie channel or a news channel. Similarly, when the user B speaks "louder", the broadcast apparatus automatically adjusts the original volume to a volume increased by +5.

As seen from the descriptions associated with FIGS. 3A and 3B, the controls signal provided by the broadcast apparatus may be categorized according to the purpose of the tags. The tags may be categorized into function instructions and adjustment instructions.

For example, a function instruction refers to an instruction type adopted for switching between broadcast functions such as "watch HBO" and "play video games"; an adjustment instruction refers to an instruction type adopted for adjusting broadcast functions such as "louder" and "fast-forward".

Referring to FIG. 3A, when the tag is a function instruction, the pre-stored broadcast parameters refer to settings in the second broadcast state such as volume settings, subtitle settings, color hue settings, and function settings.

Referring to FIG. 3B, when the tag is an adjustment instruction, the pre-stored broadcast parameters refer to settings when switching from the first broadcast state to the second broadcast state, such as a volume setting adjustment amount, a subtitle setting adjustment amount, a color hue setting adjustment amount and a function setting adjustment amount.

As previously described, parameters of volume, subtitle, color hue and function settings are all broadcast parameters adopted in the operations for adjusting the broadcast apparatus. When the tag is a function instruction or an adjustment instruction, the broadcast parameters are respectively stored as actual setting values or difference values (adjustment amounts).

It should be noted that, the tags stored in the parameter database may having different modification properties. When a modification property is an open modification property, a tag may correspond to a plurality of sets of pre-stored broadcast parameters in response to the verification information, as the exemplary instructions shown in FIGS. 3A and 3B.

On the other hand, when a modification property is a limited modification property, one tag corresponds to one set of pre-stored broadcast parameters. That is, when the modification property of a tag is a limited modification property, the broadcast apparatus does not provide different types of function operations according to different users.

FIG. 3C shows a schematic diagram of pre-stored broadcast parameters in the broadcast apparatus remaining unchanged for different user identities when a modification property of a tag is a limited modification property according to a preferred embodiment of the present invention.

For example, when the tag is "turn off", the values of the pre-stored broadcast parameters do not provide different settings for different users, and a same turning off procedure is performed. Thus, the pre-stored broadcast parameters in FIG. 3C all correspond to a fixed turning off procedure.

In short, when the modification property of a tag is a limited modification property, the volume, subtitles, color hue and function settings stored in the broadcast apparatus do not vary according to the verification information.

As such, to provide a corresponding relationship for different tags, verification information and pre-stored broadcast parameters, the broadcast apparatus may provide an instruction storage procedure, through which the parameter database storing the pre-stored broadcast parameters is established. The broadcast apparatus may also provide specific instruction storage procedures that are not tailored for the establishment of the pre-stored broadcast parameters. Instead, the instruction storage procedure is performed as a background process when the user performs normal operations to record preferences of difference users.

The parameter database is established according to the instruction storage procedure, and stores the corresponding relationship of a tag and a plurality of sets of verification information and at least one set of pre-stored broadcast parameters. Thus, the pre-stored broadcast parameters may provide parameters set for different users when the broadcast apparatus provides a broadcast function.

Figure 4:
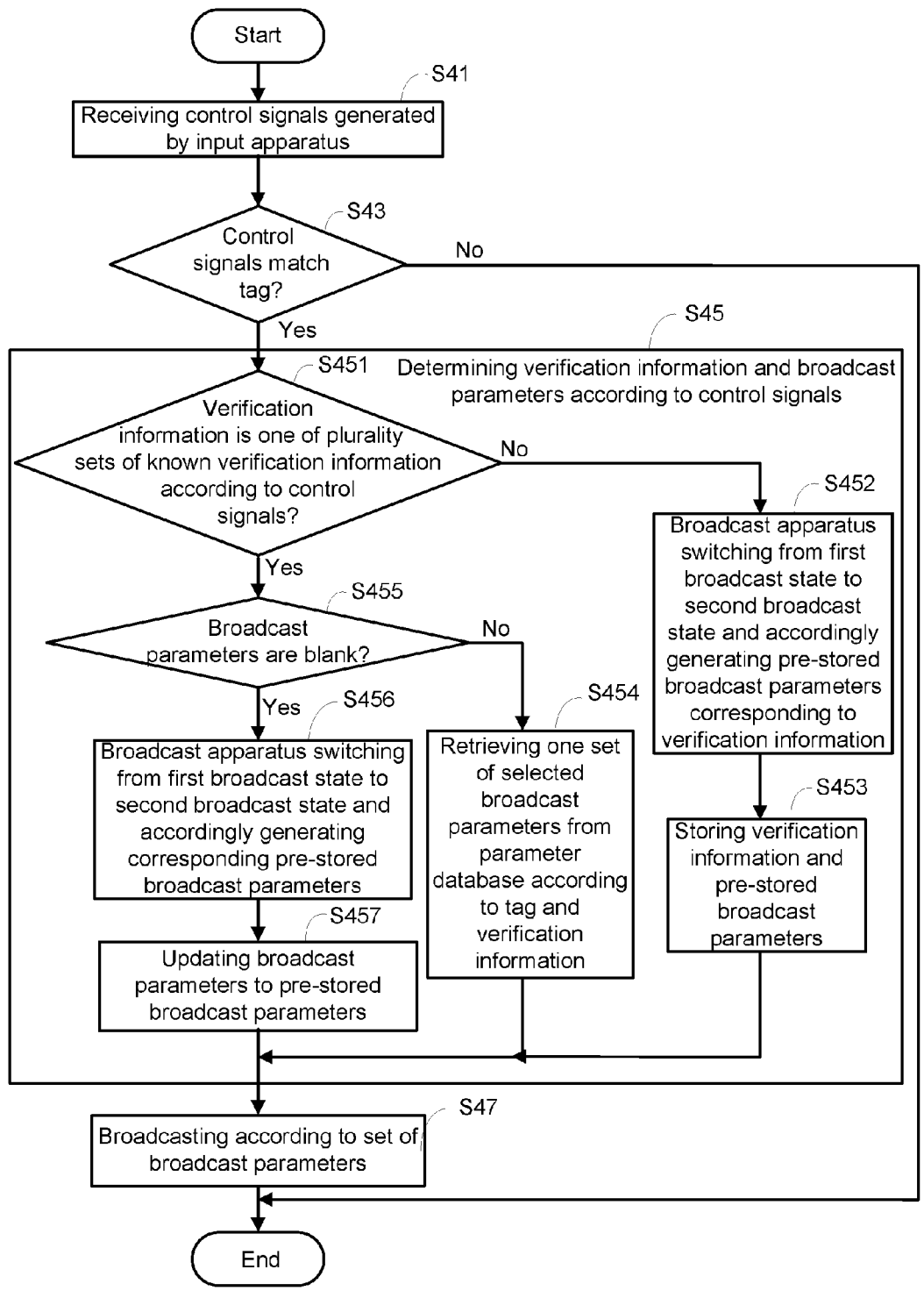
FIG. 4 is a flowchart of a broadcast method for providing personalized operations according to a preferred embodiment of the present invention.

FIG. 4 shows a flowchart of a broadcast method for providing personalized operations according to a preferred embodiment of the present invention. The broadcast method, applied to a broadcast apparatus signally connected to an input apparatus, comprises the following steps.

In step S41, a plurality of control signals generated by the input apparatus are received. In step S43, it is determined whether the control signals match a tag. The process continues when the control signals do not match the tag, or else step S45 is performed when the control signals match the tag to determine verification information and broadcast parameters according to the control signals. In step S47, broadcasting is performed according to the broadcast parameters.

In step S41, the control signals may be generated in response to different operations, e.g., speech operations, touch control operations, mouse operations, keyboard operations, and gesture operations. Further, the input apparatus may be an apparatus operable by a user, such as a remote controller, a microphone, a touch pad or an air mouse.

Taking a speech operation for example, the user may initiate a control signal for the broadcast apparatus by speaking, e.g., "watch a movie" or "play video games" to a microphone. The microphone, or another type of input apparatus, is signally connected to the broadcast apparatus, and generates a control signal corresponding to the operation according to the operation of the user.

Step S45 further comprises the following steps. In step S451, a biological characteristic retrieval is performed on the control signal satisfying a tag to generate biological characteristic data and to accordingly determine whether the verification information is one of a plurality of sets of pre-stored known verification information in a database.

When a determination result of step S451 is negative, verification information and broadcast parameters corresponding to the control signal are added to the parameter database. In step S452, the broadcast apparatus at this point switches from a first broadcast state to a second broadcast state, and accordingly generates a set of pre-stored broadcast parameters corresponding to the verification information. In step S453, the broadcast apparatus stores the verification information and the pre-stored broadcast parameters for reference of a next determination process.

When the determination result of step S451 is affirmative, step S455 is performed to divide into two situations according to whether the broadcast parameters are blank.

In the first situation when the broadcast parameters are blank, the tag has not yet been executed although the user identity is verified. In step S456, the broadcast apparatus switches from the first broadcast state to the second broadcast state, and accordingly generates a set of corresponding pre-stored broadcast parameters. In step S457, the pre-stored broadcast parameters are updated according to the broadcast parameters.

In the second situation, when the broadcast parameters are not blank, it means that broadcast parameters corresponding to the tag and the verification information are stored in the parameter database, and step S454 is performed. In step S454, the parameter database is searched to retrieve the broadcast parameters. The parameter database stores a plurality of corresponding relationships of at least the tag, a plurality of sets of verification information and at least one set of broadcast parameters.

In conclusion, in a broadcast process of the broadcast apparatus of the present invention, a control signal is analyzed according to unique verification information of a user, and an operation method of the broadcast apparatus is controlled according to selected broadcast parameters retrieved.

In addition to the above example of television operations, the present invention is also applicable to other functions provided by the broadcast apparatus, e.g., DVD, photo broadcast, music playing, computer game and Internet browsing functions. Thus, regardless of whether a user is originally watching DVD or playing video games, for example, given that the user initiates a control signal matching a tag "browse microblog", the broadcast apparatus switches the broadcast state to a broadcast state of "browse microblog" according to the selected broadcast parameters.

Apart from a broadcast apparatus such as a television, the broadcast method of the present invention is also applicable to other types of computer program products.

For example, the computer program products stores a software program, which, when executed, prompts an electronic apparatus having a controller to perform the broadcast method. That is, one of a plurality of control signals is first received. Verification information and a set of broadcast parameters are determined when the received control signal matches a tag. Broadcast is then performed according to the set of broadcast parameters.

In other words, applications of implementing the broadcast method and the instruction storage method of the above embodiments by other types of electronic apparatuses are also encompassed within the scope of the present invention.

In a preferred embodiment of the present invention, while a user performs an operation, the broadcast apparatus is capable of further determining the tag and verification information according to the control signal generated through the operation.

With the determined user identity through the verification information, after retrieving the corresponding broadcast parameters from the database according to the tag and the user identity, a broadcast instruction is executed according to the broadcast parameters. Thus, when operating the broadcast apparatus, the broadcast apparatus automatically offers a user with an operation environment satisfying personal preferences and thus a more user-friendly operation mode.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A broadcast method, for a broadcast apparatus signally connected to an input apparatus, the input apparatus generating a plurality of corresponding control signals according to a plurality of operations; the broadcast method comprising:
   receiving one of the control signals;
   determining verification information and a set of broadcast parameters when the one of the control signals matches a tag; and
   broadcasting according to the set of broadcast parameters;
   wherein, the step of determining verification information and a set of broadcast parameters when the one of the control signals matches a tag comprises:
      retrieving the broadcast parameter from a parameter database according to the tag and the verification information;
      wherein, the parameter database stores a plurality of relationships, each of the relationships corresponds to a tag, a verification information, and a set of broadcast parameters;
   wherein, when the tag is a function instruction, the set of broadcast parameters are settings of a broadcast state; and when the tag is an adjustment instruction, the set of broadcast parameters are adjustment amounts of settings of a broadcast state.

2. The broadcast method according to claim 1, the broadcast apparatus recording a plurality of sets of known verification information; wherein, the step of determining the verification information and the set of broadcast parameters comprises:
   when the verification information is not any of the plurality of sets of known verification information, the broadcast apparatus switching from a first broadcast state to a second broadcast state and accordingly generating a set of pre-stored broadcast parameters corresponding to the verification information.

3. The broadcast method according to claim 2, wherein the step of determining the verification information and the set of broadcast parameters further comprises:
   when the verification information is determined as one of the plurality of sets of known verification information, the broadcast apparatus switching from the first broadcast state to the second broadcast state, and accordingly generating a set of corresponding pre-stored broadcast parameters; and
   updating the set of broadcast parameters as the set of pre-stored broadcast parameters.

4. The broadcast method according to claim 3, wherein when the tag is a function instruction, the set of broadcast parameters are a volume setting, a subtitle setting, a color hue setting and a function setting of the second broadcast state.

5. The broadcast method according to claim 3, wherein when the tag is an adjustment instruction, the set of broadcast parameters are a volume setting adjustment amount, a subtitle setting adjustment amount, a color hue setting adjustment amount and a function setting adjustment amount of the first broadcast state switching to the second broadcast state.

6. The broadcast method according to claim 1, wherein the operations are a speech operation, a touch control operation, a mouse operation, a keyboard operation and a gesture operation.

7. The broadcast method according to claim 1, wherein when one of the control signals matches the tag, the step of determining the verification information and the set of broadcast parameters comprises:
   performing a biological characteristic retrieval on the control signals matching the tag to generate verification biological characteristic data, and accordingly determining the verification information;
   wherein, the parameter database stores a plurality of corresponding relationship of the tag, a plurality of sets of verification information and at least one set of broadcast parameters.

8. The broadcast method according to claim 1, wherein the tag has a modification property; the tag corresponds to a set of pre-stored broadcast parameters when the modification property is a limited modification property, and the tag corresponds to a plurality of sets of pre-stored broadcast parameters in response to a plurality of sets of verification information when the modification property is an open modification property.

9. A broadcast apparatus, signally connected to an input apparatus, the input apparatus generating a plurality of corresponding control signals according to a plurality of operations; the broadcast apparatus comprising:
   a reception unit, configured to receive the control signals;
   a control unit, coupled to the reception unit, for determining a tag and verification information according to the control signals;
   a storage unit, coupled to the control unit, storing a parameter database; and
   a broadcast unit, coupled to the control unit and the storage unit, for retrieving a set of broadcast parameters from the parameter database according to the tag and the verification information, and executing the set of broadcast parameters;

wherein, the parameter database stores a plurality of relationships, each of the relationships corresponds to a tag, a verification information, and a set of broadcast parameters;

wherein, when the tag is a function instruction, the set of broadcast parameters are settings of a broadcast state; and when the tag is an adjustment instruction, the set of broadcast parameters are adjustment amounts of settings of a broadcast state.

10. The broadcast apparatus according to claim 9, wherein the parameter database records a plurality of sets of known verification information; when the control unit determines that the verification information is not any of the plurality of sets of verification information, the broadcast unit switches from a first state to a second state and accordingly generates a set of pre-stored broadcast parameters corresponding to the verification information.

11. The broadcast apparatus according to claim 10, wherein the control unit determines that the verification information is one of the plurality of sets of known verification information and when the set of broadcast parameters are blank, the broadcast unit further switches from the first broadcast state to the second broadcast state according to the control signals, and accordingly generates a set of corresponding pre-stored broadcast parameters; the set of pre-stored broadcast parameters are transmitted to the storage unit to update the set of broadcast parameters.

12. The broadcast apparatus according to claim 11, wherein when the tag is a function instruction, the set of broadcast parameters are a volume setting, a subtitle setting, a color hue setting and a function setting of the second broadcast state.

13. The broadcast apparatus according to claim 11, wherein when the tag is an adjustment instruction, the set of broadcast parameters are a volume setting adjustment amount, a subtitle setting adjustment amount, a color hue setting adjustment amount and a function setting adjustment amount of the first broadcast state switching to the second broadcast state.

14. The broadcast apparatus according to claim 9, wherein the operations are a speech operation, a touch control operation, a mouse operation, a keyboard operation and a gesture operation.

15. The broadcast apparatus according to claim 9, wherein the control unit performs a signal process on the control signals to determine that one of the control signals matches the tag; the control unit further performs a biological characteristic retrieval on the control signals matching the tag to generate verification biological characteristic data, and accordingly determines the verification information.

16. The broadcast apparatus according to claim 9, wherein the broadcast unit retrieves the broadcast parameter from the parameter database according to the tag and the verification information; the parameter database stores a plurality of corresponding relationship of the tag, a plurality of sets of verification information and at least one set of broadcast parameters.

17. The broadcast apparatus according to claim 9, wherein the tag has a modification property; the tag corresponds to a set of pre-stored broadcast parameters when the modification property is a limited modification property, and the tag corresponds to a plurality of sets of pre-stored broadcast parameters in response to a plurality of sets of verification information when the modification property is an open modification property.

* * * * *